No. 852,777. PATENTED MAY 7, 1907.
T. J. DUDLEY.
COMBINED LISTER PLOW AND PLANTER.
APPLICATION FILED DEC. 16, 1904.
5 SHEETS—SHEET 1.
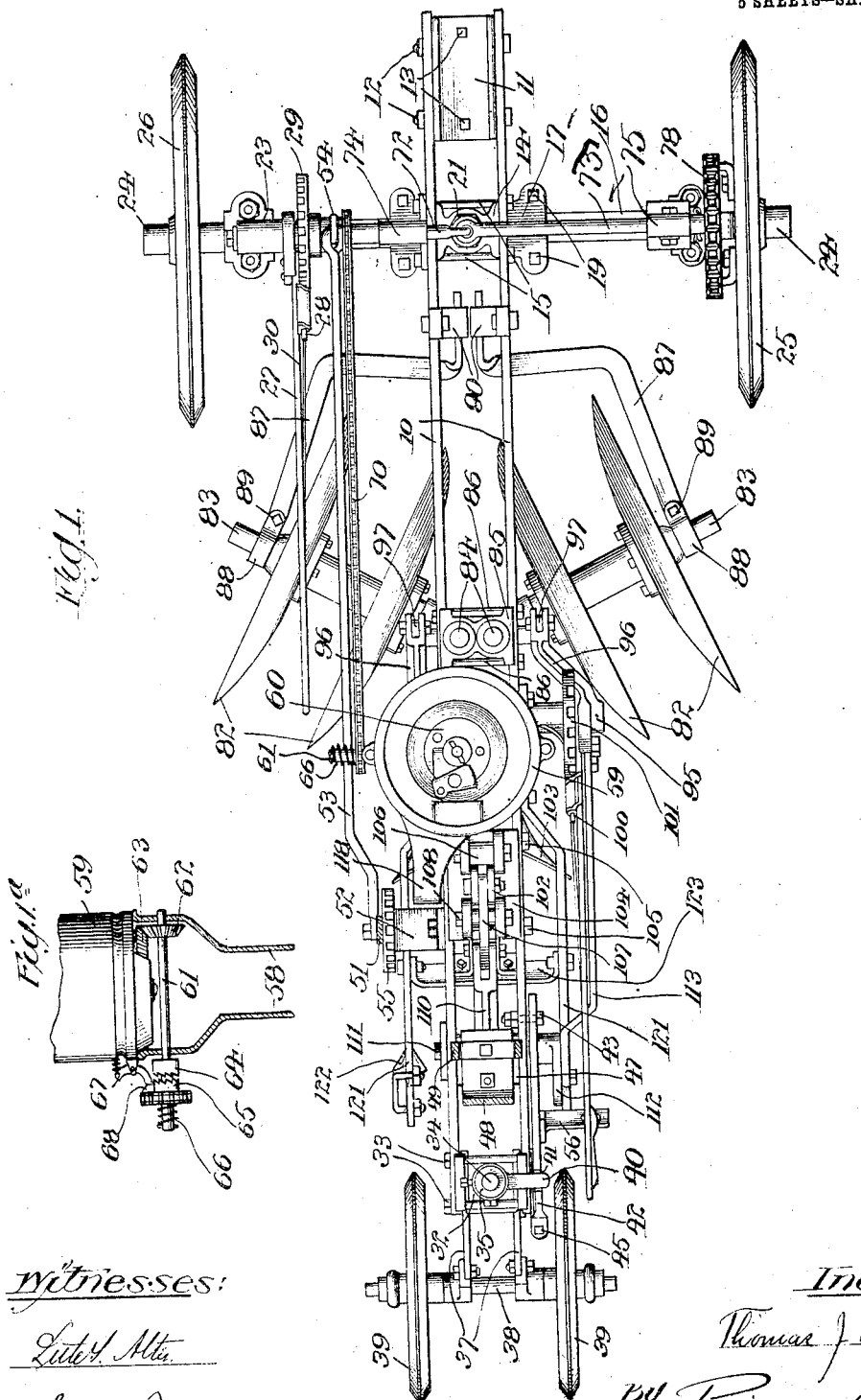
Witnesses:
Inventor
Thomas J. Dudley
by Peirce & Fisher
Attys.

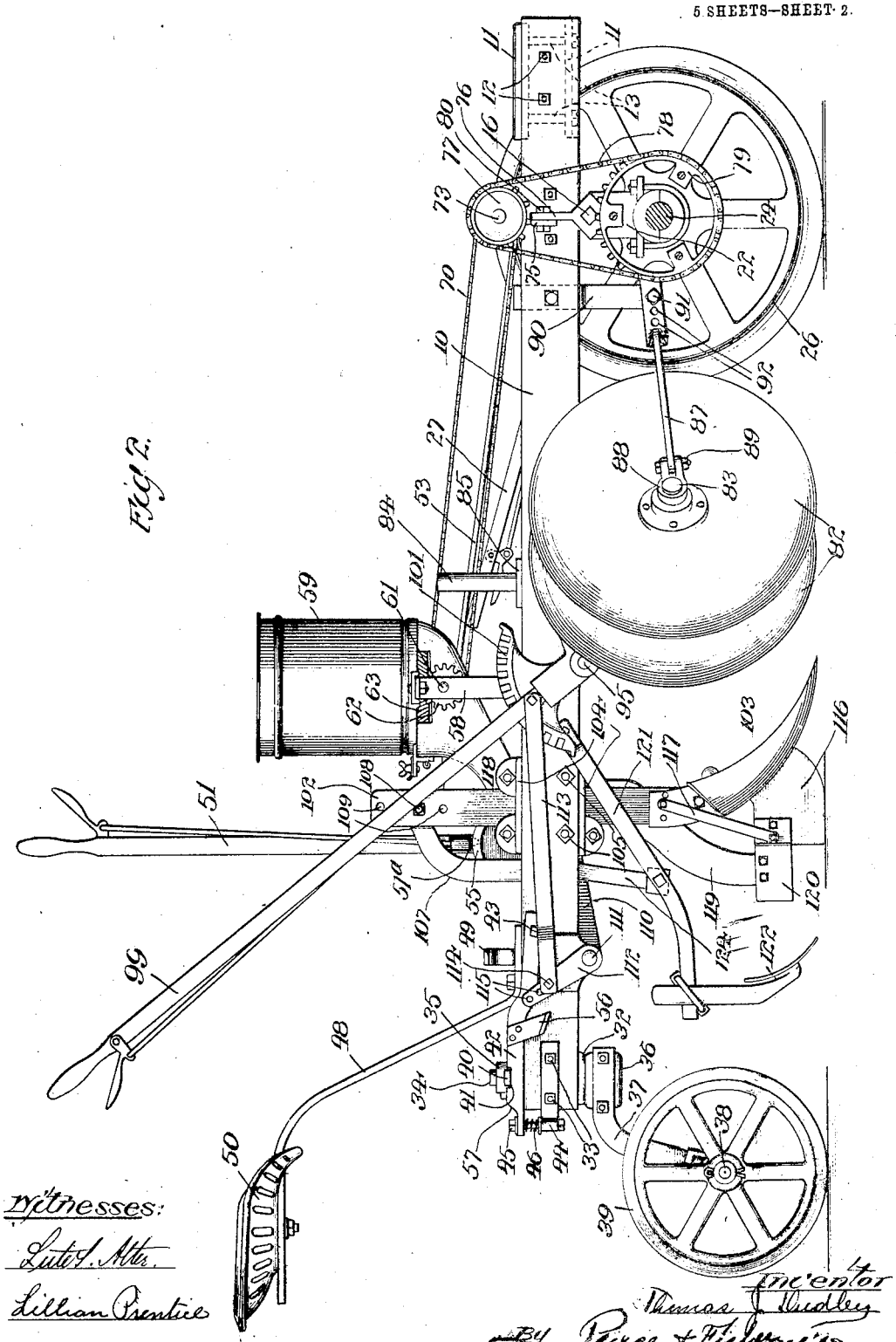

No. 852,777. PATENTED MAY 7, 1907.
T. J. DUDLEY.
COMBINED LISTER PLOW AND PLANTER.
APPLICATION FILED DEC. 16, 1904.
5 SHEETS—SHEET 3.
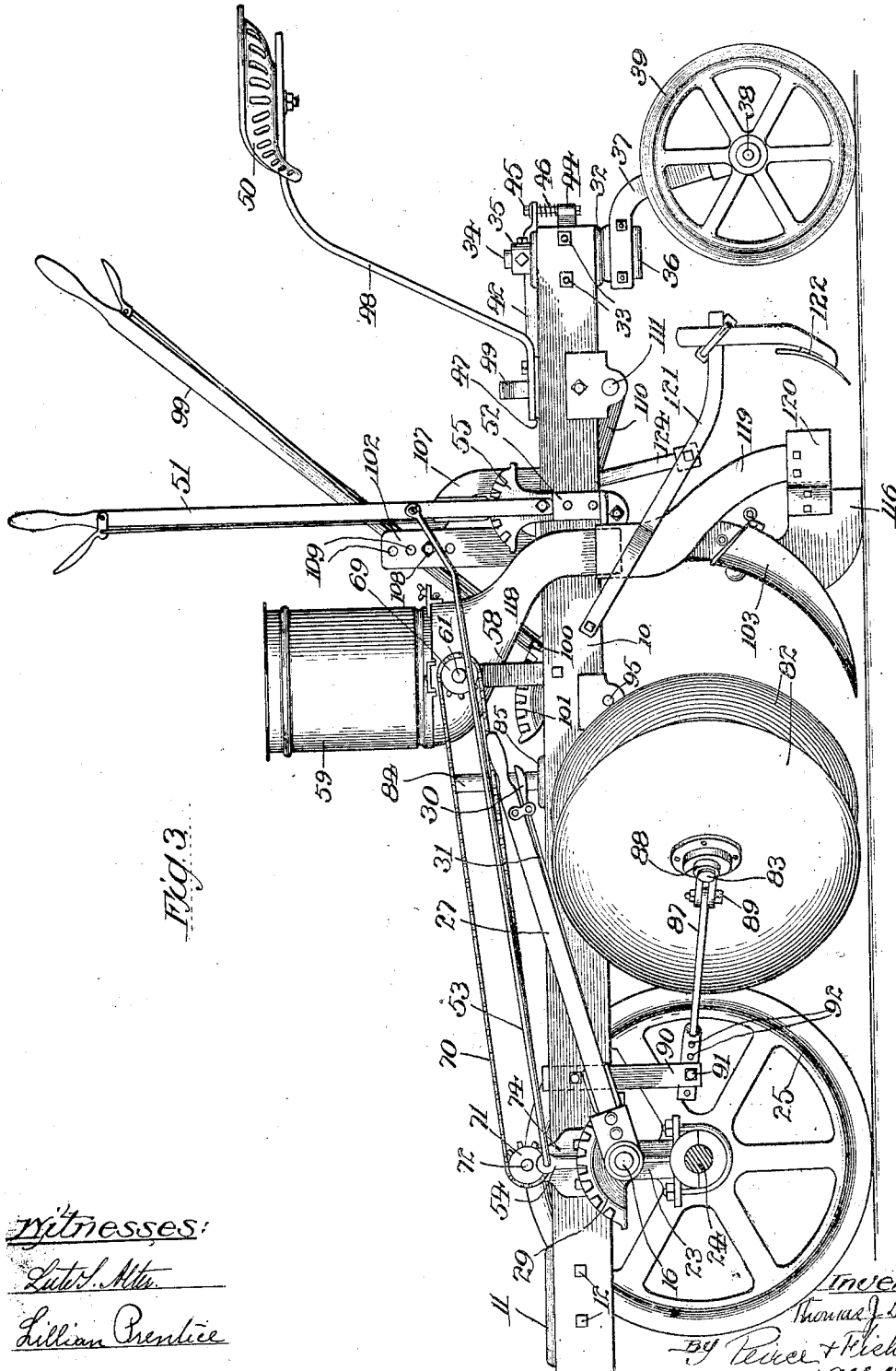

No. 852,777. PATENTED MAY 7, 1907.
T. J. DUDLEY.
COMBINED LISTER PLOW AND PLANTER.
APPLICATION FILED DEC. 16, 1904.
5 SHEETS—SHEET 4.
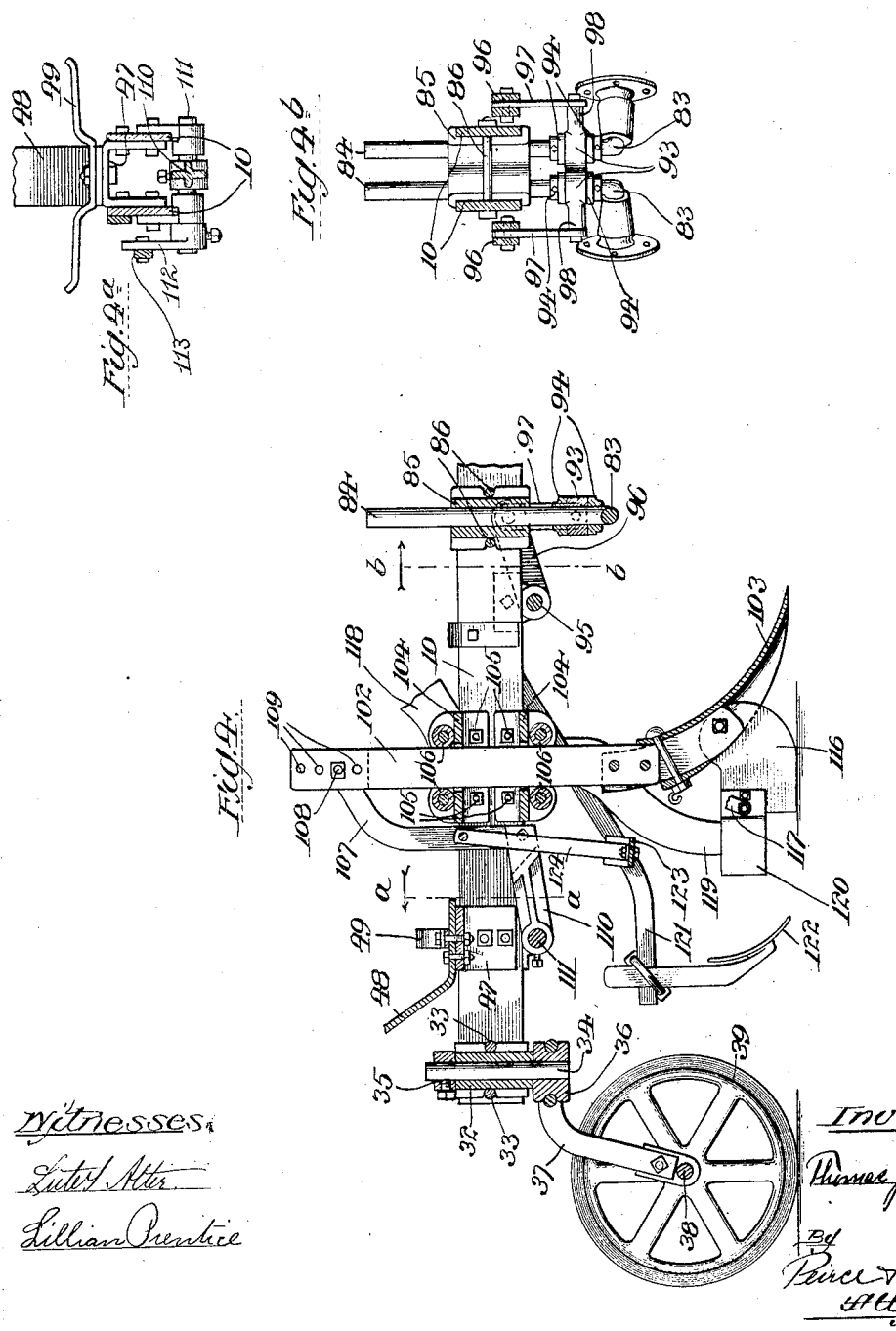

No. 852,777. PATENTED MAY 7, 1907.
T. J. DUDLEY.
COMBINED LISTER PLOW AND PLANTER.
APPLICATION FILED DEC. 16, 1904.
5 SHEETS—SHEET 5.
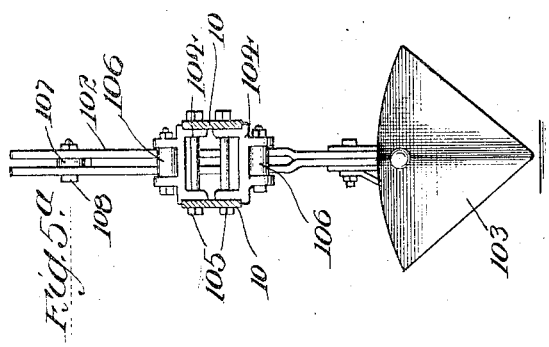
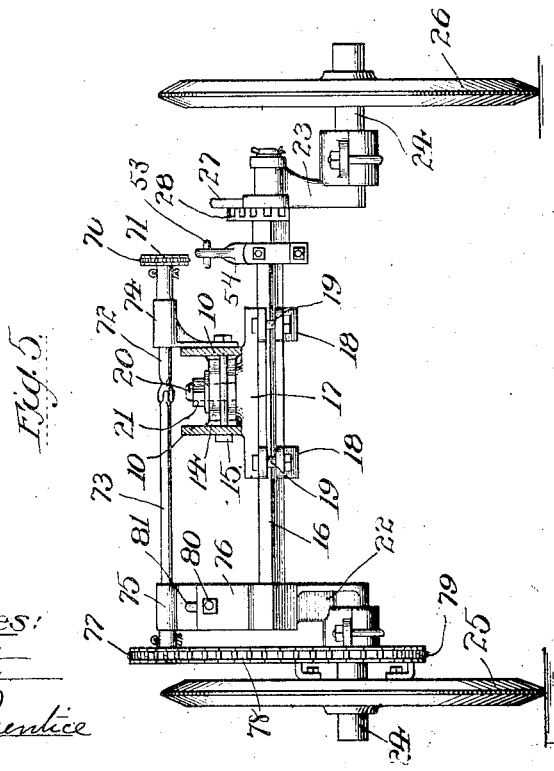

UNITED STATES PATENT OFFICE.

THOMAS J. DUDLEY, OF ABILENE, TEXAS, ASSIGNOR TO ED. S. HUGHES, OF ABILENE, TEXAS, AND H. C. STAHL, OF BELLEVUE, OHIO.

COMBINED LISTER PLOW AND PLANTER.

No. 852,777.      Specification of Letters Patent.      Patented May 7, 1907.

Application filed December 16, 1904. Serial No. 237,099.

*To all whom it may concern:*

Be it known that I, THOMAS J. DUDLEY, a citizen of the United States, and a resident of Abilene, Texas, have invented certain new and useful Improvements in a Combined Lister Plow and Planter, of which the following is declared to be a full, clear, and exact description.

The invention relates to combined listing plows and planters and seeks to provide a simple and effective implement for breaking the ground and planting the seed at one operation.

Further objects of the invention are to provide a novel arrangement of plowing disks, middle-burster furrow-opener and covering devices in connection with the seed mechanism, together with means for raising and lowering the different ground working tools.

The invention also seeks to provide a novel arrangement of steering devices and caster-wheels and to otherwise improve and simplify the construction and arrangement of parts so that the machine will be effective in operation and easy to manipulate.

The invention consists in the features of construction, combinations and arrangements of parts hereinafter set forth, illustrated in the accompanying drawings and more particularly pointed out in the appended claims.

In the drawings Figure 1 is a plan view of the improved combined lister plow and planter. Fig. 1ª is a detail view of the drive mechanism for the seeding devices. Fig. 2 is an elevation of the improved lister showing the right-hand side of the machine with the adjacent front supporting wheel removed. Fig. 3 is a similar view showing the left-hand side of the machine. Fig. 4 is a longitudinal section of the rear portion of the improved machine. Fig. 4ª is a detail section on the line *a—a* of Fig. 4. Fig. 4ᵇ is a detail section on line *b—b* of Fig. 4. Fig. 5 is a front elevation of the machine showing the steering devices; and Fig. 5ª is a detail section showing the manner of mounting the furrow-opener and its vertical standard.

The frame of the machine preferably comprises the side bars 10 arranged on edge and extending in parallel relation and adjacent to each other from front to rear of the machine. These side bars are of wrought iron or steel and of sufficient size to give great strength and rigidity to the machine.

Spacing blocks 11 are arranged between the front ends of the side bars 10 and cross bolts 12 extend between the front ends of the side bars. Vertically arranged bolts 13 (see dotted lines Fig. 2) extend between the spacing blocks 11 and the front vertical bolt 13 affords a convenient hitch for the team.

Adjacent and in the rear of the spacing blocks 11 is arranged the bearing block 14 (see Figs. 1 and 5). Bearing block 14 is held in place between the side bars 10 by the cross bolts 15. The front steering axle 16 is preferably rectangular in section as shown, and a bracket 17 is centrally secured thereto by clamps 18 and bolts 19. A vertical pivot 20 for the steering axle extends upwardly from the bracket 17 through the bearing block 14, and is held in place by a nut 21.

Arms 22 and 23 depend from the ends of the steering axle and carry stub axle 24 upon which the supporting wheels 25 and 26 are mounted. The arm 23 at the left-hand side of the machine (see Figs. 1 and 3) is swiveled to the steering axle 16 and to this arm is attached an adjusting shift-lever 27. The shift-lever 27 is provided in a well-known manner, with a latch 28, which is arranged to engage a notched segment 29 fixed to the end of the axle 16. The latch 28 is provided with the usual thumb-trip 30 connected thereto by a rod 31. By this means the arm 23 and the land-side wheel 26 may be adjusted and locked in adjusted position to level the machine when in operation.

A bearing block 32 (see Fig. 4) is held between the rear ends of the parallel side bars 10 by the cross bolts 33. A vertical pivot shaft 34 extends through the bearing block 32 and is held in place therein by the upper and lower collars 35 and 36, bolted or otherwise suitably secured to the pivot shaft. Swinging arms 37 are connected at their upper ends to the lower collar 36 and extends downwardly and rearwardly therefrom to the cross shaft or axle 38 of the caster-wheels 39. Two caster-wheels arranged closely adjacent each other, are preferably employed as shown, but a single caster wheel could be used if desired.

To the upper collar 35 (see Figs. 1 and 2) is secured a laterally extending lug or arm 40 which engages a rectangular notch 41 in a locking lever 42. The locking lever 42 is pivoted to the side of the frame by a bolt 43 and extends rearwardly therefrom beneath the arm 40. A bracket 44 (see Figs. 2 and 3) fixed to the side of the frame at the rear end carries an upright bolt 45 which extends loosely through the rear end of the locking lever 42, and a coiled spring 46, extending about the bolt and arranged between the bracket 44 and the locking lever, normally holds the latter in its uppermost position with its notched portion engaging the arm 40.

A U-piece 47 (see Fig. 4ª) is bolted or otherwise suitably secured between the side bars 10 in front of and adjacent the rear bearing block 32, and this U-piece carries the seat standard 48 and foot-rest 49. The seat standard 48 carries the rider's seat 50 at its upper end.

Within convenient reach of the rider upon the left-hand side of the machine (see Fig. 3) is arranged a shift-lever 51 which is pivoted at its lower end to a bracket 52 secured to the outer face of the left-hand side bar 10. A rod 53 is pivotally connected at its rear end to the shift-lever 51 and at its forward end to an upright bracket 54 (see Fig. 5) securely bolted to the end of the steering axle 16. The lever 51 may be provided with a latch 51ª arranged to engage a notched segment 55 mounted on the bracket 52. This latch is provided with the usual thumb lever and trip-rod, as shown. By manipulating the lever 51, the operator may shift the steering axle 16 so that the machine may be conveniently turned about corners. To assist in turning the corner, the operator may release the caster-wheels 36 by pressing with his foot upon a laterally extending lug 56 (see Figs. 1 and 2) secured to the locking lever 42. This locking lever is also arranged to be automatically released when the ground working tools are raised, as hereinafter described.

As soon as the corner is turned the caster-wheels swing in line with the machine and the arm 40 engages the notch of the locking lever 42, and the operator adjusts the front steering axle to central position so that the machine is held against side-sway during its operation. As the caster-wheels returns to normal position the arm 40 engages and depresses the locking lever 42 against the tension of the spring 46, until the arm re-engages the notch 41. To assist in this operation, the portion of the locking lever 42 having the notch 41, is somewhat elevated as shown, and this elevated portion is provided at its rear end with an incline 57 with which the arm 40 engages to depress the locking lever.

A pair of uprights 58 (see Fig. 1ª) attached to the frame bars 10 and about their central portions, carry the seed hopper 59. Any suitable form of seed mechanism may be arranged within the hopper bottom for planting corn, cotton or other seed, or the seed mechanism may be designed to plant either corn or cotton if desired. As indicated in Fig. 1, a seed plate 60 is arranged within the bottom of the seed hopper and is provided with the usual seed cells, cut off and discharging devices which may be of any suitable form and need not be more particularly described. A cross shaft 61 (see Fig. 1ª), journaled on the standards 58, below the seed hopper carries a pinion 62 which drives the gear 63 and seed plate 60 in the hopper bottom.

Tight and loose clutch members 64 and 65 are arranged upon the left-hand side of the shaft 61 and a spring 66 coiled about the outer end of the shaft tends to press the loose clutch member 65 into engagement with the tight clutch member 64. A trip 67 pivoted to the upper end of one of the standards 58, is arranged to coöperate with a cam lug 68 upon the clutch member 65 to disengage the latter from clutch member 64, and thereby arrest the operation of the seeding mechanism. When the trip 67 is thrown out of engagement with lug 68 the clutch members will be thrown into engagement by spring 66 and the seed mechanism will be operated through the medium of the gearing next described.

A sprocket wheel 69 (see Figs. 1ª and 3) is fixed to the loose clutch member 65 and is connected by a drive chain 70 with a sprocket wheel 71 carried upon the end of a counter shaft arranged over the front steering axle 16. This counter shaft is formed of separate sections 72 and 73 provided with inter-engaging eyes at their inner adjacent ends, forming a universal swiveled joint (see Figs. 1 and 5). The shaft section 72 which carries the sprocket wheel 71 is journaled in a bearing 74 fixed to one of the side bars of the frame. The shaft section 73 is journaled in a bearing 75 which is connected to an upright 76 on the end of the steering axle 16. Upright 76 is conveniently formed in one piece with the arm 22 as shown. A sprocket wheel 77 upon the end of the shaft section 73, is connected by a chain 78 with a sprocket 79 fixed to the supporting wheel 25. Bearing 75 is adjustably connected to the upright 76 by a bolt 80, which passes through the upright and through a slot 81 in the bearing so that the tension upon the chain 78 may be properly adjusted. In this manner the seed mechanism may be driven from the supporting wheel 25 and this drive gear does not interfere with the shift of the steering axle, since the universal swiveled joint between the sections of the counter-shaft is above and in line with the pivot 20 of the steering axle.

The oppositely inclined plowing disks 82 for breaking the ground, are arranged in front of the seed mechanism as shown, and preferably two of such disks are arranged on each side of the machine. The disks are mounted upon shafts 83 having upright standards 84, preferably formed by turning up the inner ends of the shafts. A bearing block 85 (see Figs. 4 and 4ᵇ) is secured between the frame bars 10 by bolts, 86, and the upturned ends or standards 84 of the disk shafts, are arranged to shift vertically and rotate through suitable openings formed in the bearing block 85.

Angular L-shaped brace links 87 (see Figs. 1 and 2) connect the outer ends of the disk shafts 83 with the frame. Preferably, split collars 88 surround the ends of the disk shafts 83 and are secured to the outer ends of the brace links by vertical bolts 89. Brace links 87 are bent inwardly toward the frames shown, and their inner ends have forwardly extending portions which are secured to the lower ends of straps 90, by horizontal pivot bolts 91. Straps 90 are secured at their upper ends to the frame bars 10 and project downwardly therefrom. Bolts 91 are arranged to engage any one of a series of holes 92 formed in the inner ends of the brace links 87 to thereby adjust the angular position of the disk shafts 83 and the inclination of the disks. The links 87 securely brace the outer ends of the disk shafts. Moreover, the vertical pivot connection 89 at their outer ends, and the horizontal pivot connections 91 at their inner ends permit the angular adjustment of the disk shaft and disks and also permit the vertical movement thereof as the disks are lowered and raised to and from working position.

Sleeves 93 (see Figs. 4 and 4ᵇ) are loosely mounted upon the lower ends of the standards 84, but are held against longitudinal movement thereon by collars 94 adjustably fixed to the standards above and below the sleeves. A horizontal rock-shaft 95 journaled in suitable bearings carried by the frame bars, is provided with a pair of arms 96 which are connected by links 97 with laterally projecting lugs 98 upon the sleeves 93. A shift lever 99 (see Fig. 2) is fixed to one end of the rock shaft 95 and extends rearwardly within convenient reach of the operator so that the disk shafts and disks may be raised and lowered to and from working position. The shift lever 99 is provided in a well-known manner with a latch 100 (see Fig. 3) arranged to engage a toothed segment 101 fixed to the frame and the latch is arranged to be released by the usual thumb lever and trip rod. The connections between the shift lever 99 and the disks may be adjusted as desired, by adjusting the collars 94 upon the upturned ends or standards 84 of the disk shafts.

In the rear of the seeding mechanism, but in front of the delivery end of the seed chute leading therefrom, is arranged a vertical standard 102 which carries on its lower end a middle bursting furrow-opener 103, preferably of the double mold board type, which is arranged behind and midway between the oppositely inclined disks or disk gangs, and coöperates therewith to thoroughly pulverize the soil and throw it in opposite directions and which also forms the furrow in which the seed is planted.

Upper and lower bearing boxes 104 are arranged between the frame bars 10 and secured thereto by cross bolts 105, and each bearing box is provided with a front and rear antifriction roll 106, engaging respectively the front and rear faces of the standard 102, which passes through the bearing boxes. Standard 102 is preferably formed as shown, with separate sections spaced apart at their upper end (see Fig. 5ᵃ), and a link 107 is adjustably connected at its upper end to the upper end of the standard by a cross bolt 108, which is arranged to engage any one of a series of holes 109 in the standard. The lower end of the link 107 is pivotally connected to the forward end of a rock arm 110, which is fixed to a rock-shaft 111 mounted in suitable bearings upon the frame bars. A crank arm 112 (see Fig. 2) is fixed to the outer end of the rock-shaft 111 and is connected by a link 113 to the shift-lever 99. The rear end of the link 113 is preferably adjustably connected to the rock arm 112 by a bolt 114 arranged to engage any one of a series of holes 115 in the end of this rock arm. By this arrangement the common lever 99 connected to the vertically shifting standards of the plowing disks and furrow-opener, is arranged to shift these parts to and from working position. It will also be observed that the connections between the shift lever and the plowing disks and between the shift lever and the furrow-opener are independently adjustable. In the rear of the furrow-opener is arranged a guiding blade or knife 116 (see Fig. 2) which is bolted at its forward end to the lower end of the furrow-opener standard. A brace link 117 extends between the standard and the rear end of the guide blade.

The delivery chute from the seed hopper and seeding mechanism, comprises an upper section 118, which extends rearwardly and downwardly from the seed hopper and on one side of the frame (see Figs. 1 and 3). The lower chute section 119 is secured at its lower end to plates 120, which are fixed to the rear end of the guide blade 116. The upper end of the chute section 119 telescopes upon the lower end of the chute section 118, as shown in Fig. 3, and this lower chute section is raised and lowered with the furrow-opener 103.

Drag bars 121 are pivoted at their forward ends to the frame bars 10, extend rearwardly on opposite sides of the standard 102 and carry covering shovels 122 in rear of the seed chute 119. The drag bars 121 are connected by a cross piece 123 (see Fig. 4) and a link 124 connected to the cross piece and is pivoted at its upper end to the link 107, so that the drag bars are raised with the furrow-opener and plowing disks by the common shift lever 99.

The rock-arm 112 upon the end of the shaft 111 (see Figs. 1 and 2) is arranged to engage the lug 56 and release the lock 42 for the rear caster-wheels when the plowing disks and furrow-opener are raised to riding position.

The listing machine constructed in accordance with the present invention, may be used both to break or plow the ground and also to plant the seed. The plowing disks, furrow-opener, seed chute and covering devices are conveniently raised and lowered from and to working position by a common shift-lever, and this shift mechanism also serves to automatically release the lock for the rear caster wheel. It should be observed in this connection that the frame of the machine is a substantially rigid or unjointed frame, as distinguished from frames composed of pivoted sections, which, by their relative movement, serve to raise and lower the ground-working devices, and it will be further noted that said frame is firmly supported at a fixed or uniform distance above the ground, thereby supporting the driver and the seed hopper and distributing mechanism at a fixed height, the movement of the ground-working devices and seed-chute toward and from the ground, in their adjustment relatively to the surface of the soil, being effected by levers mounted on the frame thus supported, so that said parts are moved and held in position relatively to said frame, without requiring any movement of the frame itself. By means of the shift-lever 51 the steering of the machine is readily controlled by the operator. If desired, the machine may be used for plowing the ground alone in which case the furrow-opener, seeding devices and one of the disk gangs would be removed. For plowing alone with one of the disk gangs, an inclined caster-wheel is preferably provided at the rear of the machine to resist the side draft.

It is obvious that the details of structure may be varied without departure from the essentials of the invention, and that portions of the invention may be employed without its adoption as a whole.

Having described my invention, what I claim as new and desire to secure by Letters Patent is:—

1. In a lister, the combination, with a frame supported at a fixed distance above the ground, and a seeding mechanism, of oppositely arranged disks, a furrow-opener in the rear of said disks, said disks and furrow-opener being independently mounted on said frame, and means adapted to be operated from the driver's seat for raising and lowering the same relatively to said frame, substantially as described.

2. In a lister, the combination, with the frame supported at a fixed distance from the ground, and a seeding mechanism, of oppositely arranged disks, a furrow-opener in the rear of said disks, said disks and furrow-opener being independently mounted on said frame, and a common shift-lever connected to the said disks and furrow-opener to raise and lower the same relatively to said frame, substantially as described.

3. In a lister, the combination, with a frame supported at a fixed distance from the ground, and a seeding mechanism, of oppositely arranged disks, a furrow-opener in the rear of said disks, independent vertically movable standards whereon said disks and furrow-opener are mounted, and means common to both of said standards for simultaneously raising and lowering the same relatively to said frame, substantially as described.

4. In a lister, the combination, with a frame supported at a fixed distance from the ground, and a seeding mechanism, of oppositely arranged disks, a furrow-opener in the rear of said disks, a common shift lever for raising and lowering the said disks and furrow-opener relatively to said frame, and adjustable connections between said lever and said disks and between said lever and said furrow-opener, substantially as described.

5. In a lister, the combination, with a frame supported at a fixed distance from the ground, and seeding mechanism, of oppositely arranged plowing disks, a middle-bursting furrow-opener in the rear of said disks, a pair of rock-shafts journaled in the frame and connected to said disks and middle-burster for raising and lowering the same relatively to said frame, and means for operating said rock-shafts, substantially as described.

6. In listers, the combination with the frame and seeding mechanism, of the oppositely inclined plowing disks, a middle-bursting furrow-opener in rear of said disks, a pair of rock-shafts journaled on the frame, crank arms on said shafts, links connecting said crank-arms with said disks and said furrow-opener, and means for operating said rock shafts, substantially as described.

7. In listers, the combination with the frame and seeding mechanism, of the oppositely arranged plowing disks, a middle-bursting furrow-opener in rear of said disks, a pair of rock-shafts journaled in the frame and connected to said disks and middle-burster for raising and lowering the same, a common shift-lever mounted upon one of said rock-shafts, a crank arm upon the other of said rock-shafts and a link connecting said lever and said crank-arm, substantially as described.

8. In listers, the combination with the frame and seeding mechanism, of a disk, a disk-shaft having an upright standard, a bearing on the frame through which said standard is vertically movable, a shift-lever mounted on the frame and means adjustably secured to said standard for connecting the same to said lever to raise and lower said shaft and disks, substantially as described.

9. In listers, the combination with the frame and seeding mechanism, of a disk, a disk-shaft having an upright standard at its inner end, a bearing on the frame through which said standard is vertically shiftable, an L-shaped link connecting the outer end of said shaft to the frame and shift-lever mechanism for raising and lowering said shaft and disk, substantially as described.

10. In listers, the combination with the frame and seeding mechanism, of a disk, a disk-shaft arranged to swing to adjust the inclination of the disk and having an upright standard a bearing on the frame, through which said standard is vertically shiftable, an adjustable link pivotally connected to the outer ends of said shaft and to said frame and shift-lever mechanism arranged to raise and lower said shaft and disks, substantially as described.

11. In listers, the combination with the frame and seeding mechanism, of a disk, a disk-shaft arranged to swing to adjust the inclination of the disk and having an upright standard, a bearing on said frame through which said standard is vertically shiftable, a link connected by a vertical pivot bolt to the outer end of said shaft and adjustably connected at its forward end by a horizontal pivot bolt to the frame and shift-lever mechanism for raising and lowering the shaft and disk, substantially as described.

12. In listers, the combination with the frame and seeding mechanism, of a disk, a disk-shaft having an upright standard, a bearing on the frame in which said standard is rotatably and vertically movable, adjustable connections between said shaft and the frame, a shift-lever and connections between said lever and said shaft for raising and lowering the same, substantially as described.

13. In listers, the combination with the frame and seeding mechanism, of a disk, a disk-shaft having an upright standard, a bearing on the frame in which said standard is rotatably and vertically movable, adjustable connections between said shaft and the frame, a sleeve loosely mounted upon said standard, adjustable collars for holding said sleeve against longitudinal movement on said upright standard and lift mechanism connected to said sleeve, substantially as described.

14. In listers, the combination with the frame and seeding mechanism, of the oppositely arranged disks, a pair of disk-shafts having upright standards at their inner ends, bearings on the frame through which said uprights extend, a shift-lever mounted on the frame, connections between said shafts and said lever for raising and lowering the disks, and adjustable link connections between the outer ends of the disk-shafts and the frame, substantially as described.

15. In listers, the combination with the frame and seeding mechanism, of the oppositely arranged disks, a pair of disk-shafts having upright standards at their inner ends, bearings on the frame through which said uprights extend, a horizontal rock-shaft journaled in the frame and operating lever therefor, arms on said shaft, link connections between said arms and the inner ends of the disk-shafts for raising and lowering the disks and link connections between the outer ends of the disk-shaft and the frame, substantially as described.

16. In listers, the combination with the frame and seeding mechanism, of the oppositely arranged disks, a pair of disk-shafts having upright standards at their inner ends, bearings on the frame through which said uprights extend, a shift-lever on the frame, adjustable link connections between said shift-lever and the inner ends of said disk-shafts for raising and lowering the disks, and adjustable link connections between the outer ends of the disk-shafts and the frame for adjusting the inclination of the disks, substantially as described.

17. In listers, the combination with the frame and seeding mechanism, of the oppositely arranged disks, a pair of disk-shafts having upturned inner ends forming vertical standards, bearings on the frame whereon said standards are rotatably and vertically movable, adjustable connections between the outer ends of the disk-shafts and the frame, sleeves loosely mounted on the standards but held against longitudinal movement thereon and shift-mechanism for raising and lowering the disks connected to said sleeves, substantially as described.

18. In listers, the combination with the frame and seeding mechanism, of the oppositely arranged disks, a pair of disk-shafts having upturned inner ends forming vertical standards, bearings on the frame whereon said standards are rotatably and vertically movable, adjustable connections between the outer ends of the disk-shafts and the frame, sleeves loosely mounted on the standards but held against longitudinal movement thereon, a horizontal rock-shaft journaled on the frame, an operating lever therefor, arms on said shaft and links between said arms and said sleeves, substantially as described.

19. In a lister, the combination, with the frame supported at a fixed distance above the ground, of the seeding mechanism and seed chute, oppositely arranged plowing disks in front of said seed chute, covering devices in the rear of said chute, said disks and covering devices being independently mounted on said frame, and means adapted to be operated from the driver's seat for vertically adjusting said disks and said covering devices relatively to said frame, substantially as described.

20. In a lister, the combination, with the frame supported at a fixed distance above the ground, of the seeding mechanism and seed chute, oppositely arranged plowing disks in front of said seed chute, covering devices in the rear of said seed chute, said disks, seed chute and covering devices being independently mounted on said frame, and a shift-lever and connections common to said disks, seed chute and covering devices for simultaneously adjusting the same relatively to said frame.

21. In listers, the combination with the frame, of the seed mechanism and seed chute, the oppositely arranged plowing disks in front of said seed chute, covering devices in rear of said seed chute, a pair of rock-shafts journaled on the frame, a common shift-lever connected to said shafts, connections between one of said shafts and said disks and connections between the other of said shafts and said covering devices, substantially as described.

22. In a lister, the combination, with a frame supported at a fixed distance above the ground, and a seed hopper and distributing mechanism mounted on said frame, of a seed chute, oppositely arranged plowing disks in front of said chute, a middle-burster between said disks and said chute, said disks, and middle-burster being independently mounted on said frame, and means for raising and lowering said disks, middle-burster and chute relatively to said frame, substantially as described.

23. In a lister, the combination, with a frame, of the seeding mechanism and seed chute, of the oppositely arranged plowing disks in front of said chute, a middle-burster between said disks and said chute, covering devices in the rear of said seed chute, said disks, middle-burster and covering devices being independently mounted on said frame, and a common shift-lever in operative connection for raising and lowering the same relatively to said frame.

24. In listers, the combination with the frame, of the seed mechanism, a seed chute having a lower telescoping section, a middle-bursting furrow-opener in front of said chute and connected to said telescopic chute section, drag bars pivoted to the frame, covering devices carried by said drag bars in rear of said seed chute, a cross rock-shaft on the frame, an arm on said shaft, links connecting said arm to said furrow-opener and to said drag bars, and an operating shift-lever for said rock-shaft, substantially as described.

25. In listers, the combination with the frame, of the seed mechanism and seed chute, a furrow-opener in front of said seed chute, an upright, vertically shiftable standard for said furrow-opener, drag bars pivoted to the frame, covering devices carried by said drag bars in rear of said seed chute, a cross rock-shaft on the frame, link connections between said rock-shaft and the drag bars, an adjustable link connection between the rock-shaft and said upright standard and a shift-lever connected to said rock-shaft, substantially as described.

26. In listers, the combination with a frame supported at a fixed distance above the ground, and a seed hopper and distributing mechanism mounted on said frame, of a seed-chute, a plowing device in front of said seed chute, a furrow-opener between said plowing device and chute and independent thereof, separate standards adjustably mounted in said frame whereon said plowing device and furrow-opener are mounted and a common shift-lever for raising and lowering said standards, substantially as described.

27. In listers, the combination with the frame, of the seed mechanism and seed chute thereon, a plowing device in front of said seed chute, a furrow-opener between said plowing device and chute, separate upright vertically shiftable standards whereon said plowing device and furrow-opener are mounted, separate cross rock-shafts connected respectively to said standards and a common shift lever connected to said standards, substantially as described.

28. In listers, the combination with the frame, of the seed mechanism and seed chute thereon, a plowing device in front of said seed chute, a furrow-opener between said plowing device and chute, covering devices arranged in rear of said seed chute, a pair of rock-shafts, links connecting one of said rock-shafts to said plowing device, links connecting the other of said rock-shafts to said furrow-opener and to said covering devices, and a common operating lever connected to said rock-shafts, substantially as described.

29. In listers, the combination with the frame and the seeding mechanism, of a furrow-opener, an upright, vertically shiftable standard whereon said furrow-opener is mounted, a plurality of brackets mounted one above the other on said frame and having openings therethrough to form upper and lower bearing boxes through which said standard extends, a pair of antifriction rollers mounted in each of said bearing boxes and arranged to engage respectively the front and rear faces of said standard and means for shifting said standard, substantially as described.

30. In listers, the combination with the frame comprising parallel adjacent side bars extending from front to rear of the furrow-opener, and the seeding mechanism, of an upright, vertically shiftable standard for said furrow-opener, brackets secured between the side-bars of the frame and having openings therethrough forming upper and lower bearing boxes through which said standard extends secured between the side bars of the frame and rollers carried by said bearing boxes engaging the front and rear faces of said standard, substantially as described.

31. In listers, the combination with the frame comprising parallel adjacent side-bars extending from front to rear and connected at their opposite ends, of a seed mechanism and seed chute thereon, a plowing device and furrow-opener in front of said seed chute, upright, vertically shiftable standards for said plowing device and furrow-opener, bearing boxes for said standards secured between the side bars of the frame, and a common shift-lever connected to said standards, substantially as described.

32. In listers, the combination with the frame comprising parallel adjacent side-bars extending from front to rear and connected at their opposite ends, of a seed mechanism and a seed chute thereon, a plowing device and furrow-opener in front of said seed chute, upright, vertically shiftable standards for said plowing device and furrow-opener, bearing boxes for said standards secured between the side-bars of the frame, drag bars pivoted to the outer faces of said side-bars, covering devices carried by said drag bars in rear of said seed chute, a pair of horizontal rock-shafts journaled on the side bars of the frame on said shafts, links connecting said arms to said standard and connecting one of said arms to said drag bars and a common shift-lever connected to said rock-shafts, substantially as described.

33. In listers, the combination with the frame and with the seeding mechanism carried thereby, of the steering axle swiveled to said frame, a counter-shaft comprising separate sections, one of said sections being connected to said axle and the other to the frame, and gearing connecting said counter-shaft and seed mechanism, substantially as described.

34. In listers, the combination with the frame and with the seeding mechanism carried thereby, of the steering axle swiveled to said frame, a supporting wheel carried by said axle and a counter-shaft comprising separate sections swiveled together in line with the pivot of said axle, one of said sections being mounted on the axle and geared to said wheel, and the other of said shaft sections being mounted on the frame and geared to said seeding mechanism, substantially as described.

35. In listers, the combination with the frame and with the plowing and seeding devices carried thereby, of a front steering axle, a center upright pivot connected thereto, a bearing for said pivot mounted on the frame, depending arms on the ends of said axle, one of which is swiveled thereto, stub axles carried by said arms, supporting wheels on said stub axles and shift-levers connected to said steering axle and to said swiveled arm, substantially as described.

36. In a lister, the combination, with the frame, the seeding mechanism and the seed chute on said frame, of front and rear supporting wheels for said frame, oppositely arranged plowing disks in front of said seed chute, a middle-bursting furrow-opener between said disks and seed chute, covering devices in the rear of said seed chute, said disks, furrow-opener and covering devices being independently mounted on said frame, and a common device for raising and lowering the same relatively to said frame, substantially as described.

THOMAS J. DUDLEY.

Witnesses:
A. SIDNEY PAYTON,
MET MERTIN GLOVER.